May 4, 1937.　　　　O. BIGINELLI　　　　2,079,102
METHOD OF MAKING METAL CASES FROM A TUBULAR PIECE
Filed Aug. 17, 1934　　　4 Sheets-Sheet 1

INVENTOR
ORESTE BIGINELLI
BY
Richards & Geier
ATTORNEYS

May 4, 1937.  O. BIGINELLI  2,079,102
METHOD OF MAKING METAL CASES FROM A TUBULAR PIECE
Filed Aug. 17, 1934  4 Sheets-Sheet 2

INVENTOR
ORESTE BIGINELLI
BY
Richards & Geier
ATTORNEYS

May 4, 1937.   O. BIGINELLI   2,079,102
METHOD OF MAKING METAL CASES FROM A TUBULAR PIECE
Filed Aug. 17, 1934   4 Sheets-Sheet 3
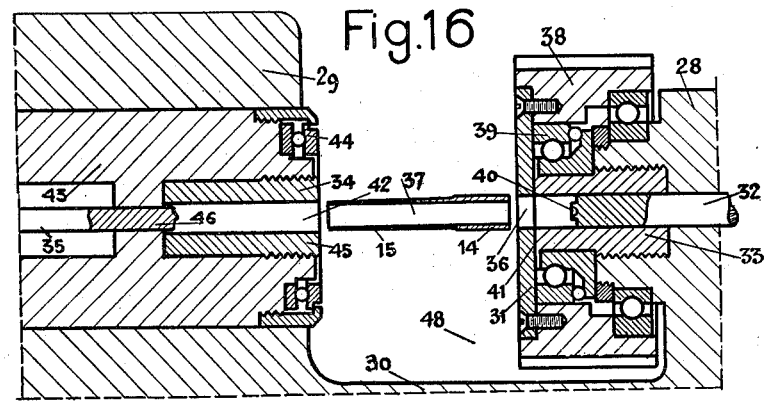
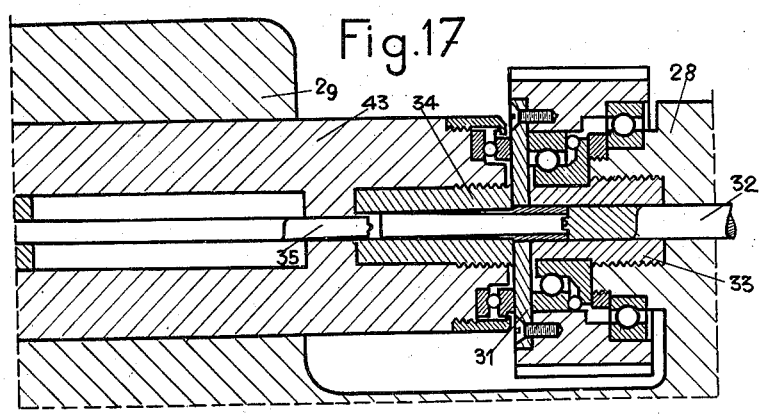
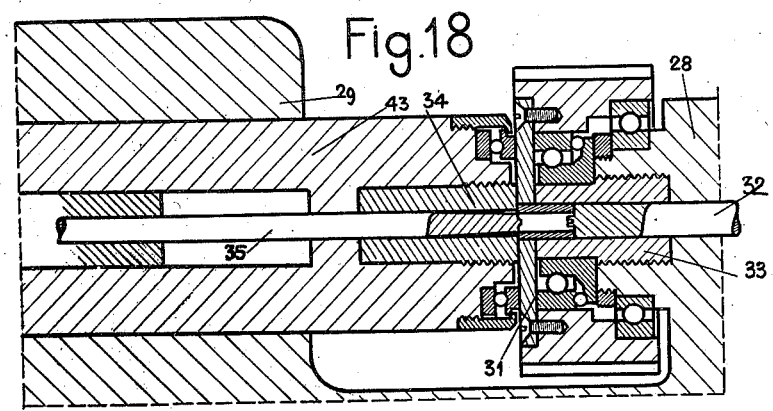
INVENTOR
ORESTE BIGINELLI
BY
Richards & Geier
ATTORNEYS

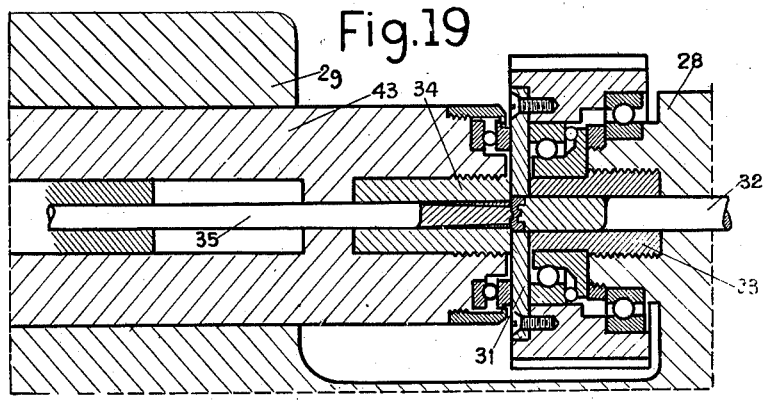
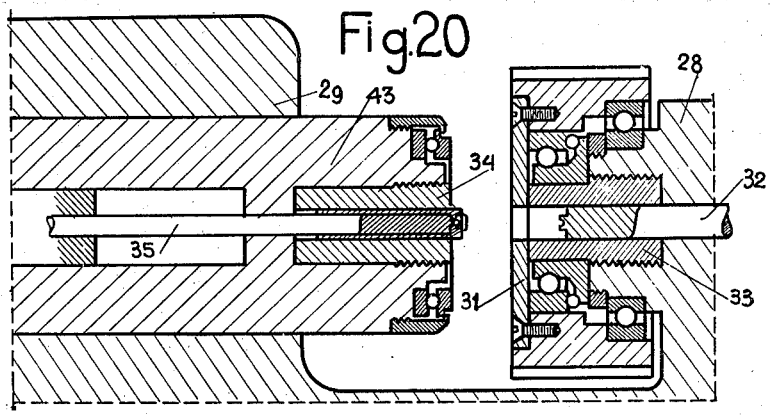
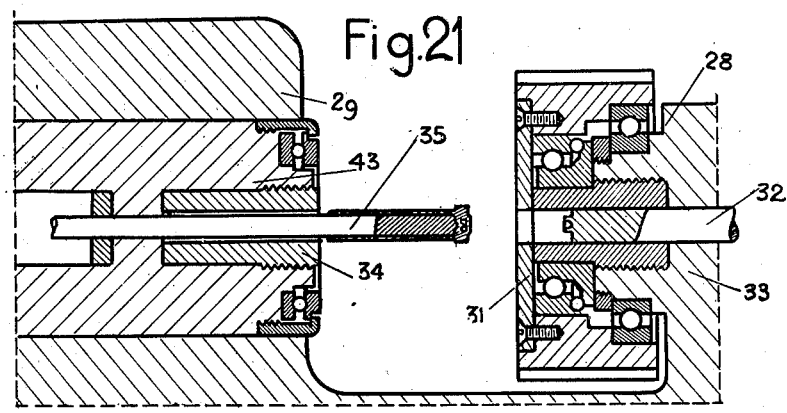

Patented May 4, 1937

2,079,102

UNITED STATES PATENT OFFICE 2,079,102

METHOD OF MAKING METAL CASES FROM A TUBULAR PIECE

Oreste Biginelli, Clermont-Ferrand, France

Application August 17, 1934, Serial No. 740,209
In France August 22, 1933

4 Claims. (Cl. 29—1.3)

This invention relates to a new method of manufacturing metal cases from a tubular piece and refers more particularly to a method for manufacturing cartridge cases, detonators and the like by means of a drawn tubular part, preferably without welding.

It is well known that the usual method of manufacturing cartridge cases consists in taking a blank generally of copper or brass, flanging it and drawing it by successive operations. In the case of fire arm cartridges about ten operations are required for producing a first form of cylindrical case having a length equal to that of the cartridge case to be produced and in which the thickness of the walls is the same, said drawing operations requiring a plurality of intermediary annealing operations. The bottom of this first shape of case is then modified by swaging in order to give it its final shape which comprises the priming recess. The case is then hammered out near its open end so as to form the worked over neck for the ball, the body being at the same time brought from the cylindrical shape to the slightly conical shape of the cartridge case body. Finally the latter is submitted to a smooth turning for finishing off the bottom (clip groove, etc.) and for drilling the vent holes.

Due to the great number of operations the above manufacturing process requires a very important mechanical outfit as well as a plant for annealing furnaces. Moreover the remarkably long drawing operation to which the metal is submitted involves a very high percentage of waste which is still increased by the difficulties caused by the stamping out of the bottom of the cartridge case. Lastly the above method allows only the manufacturing of brass cartridge cases.

An object of the present invention is to produce a cartridge case or similar case from a length of metal tubing, said case having an end wall or head of any desired thickness and strength which is not dependent upon the original thickness of the wall of the tube.

In accordance with the present invention the cartridge case or a similar metallic case is made from any length of metal tubing by applying axial pressure to a portion of the tubing at one end thereof, and thereby forming the end wall or head. This end portion of the tubing is supported against outward lateral movement but is permitted to move inwardly. The metal of the end portion of the tubing is thus caused to spread and flow laterally inwards until a point is reached at which the deformed metal forms a solid end wall or head which may have a greater thickness than that of the side wall of the tubing.

Compared with the ordinary process of manufacturing, the present method allows of producing the case with a more limited number of operations, consequently the machinery is considerably reduced, and it also does away with the use of annealing furnaces. All said reasons viz; reduction of the number of operations, reduction of the required machinery, reduction of waste result in a net cost which is much lower than the usual one. Lastly, another very important advantage of the new method consists in that it may be applied to brass as well as to other metals and alloys, more especially to aluminium and its light alloys.

The present method comprises substantially in the above mentioned case two operative stages:
1.—A drawing stage.
2.—A closing stage.
It comprises accessorily and eventually a third finishing stage executed by known means.

My invention and its advantages will best be understood from the following description and by reference to the accompanying drawings wherein I have illustrated by way of example its application to the manufacture of cartridge cases of the Mauser type.

Fig. 16 is a longitudinal section showing the apparatus used during said second operative stage when inoperative.

Figs. 17, 18, 19, 20 and 21 are similar views illustrating the working positions of the elements of said apparatus during the second stage.

Figure 1:
Figs. 1 to 6 illustrate in longitudinal sectional views the changes undergone by the tube in the first operative stage.
Figure 4:
Figure 2:
Figure 5:
Figure 3:
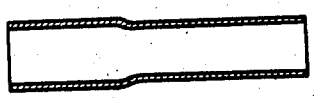
Figure 6:
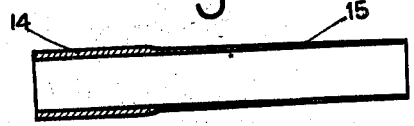

The first operative stage has for its object to transform the primitive tubular part so as to give it the shape shown in Fig. 6. Said shape comprises a cylindrical portion 14 composed of the metal which will be subsequently stamped in the course of the second stage to constitute the bottom of the cartridge case, and another portion 15 having the exact dimensions of the cartridge case to be produced, as well as the same wall thickness.

Figs. 1, 2, 3, 4, 5 and 6 show the changes undergone by the tubular part from its primitive state (Fig. 1) to its final condition (Fig. 6).

Figure 7:
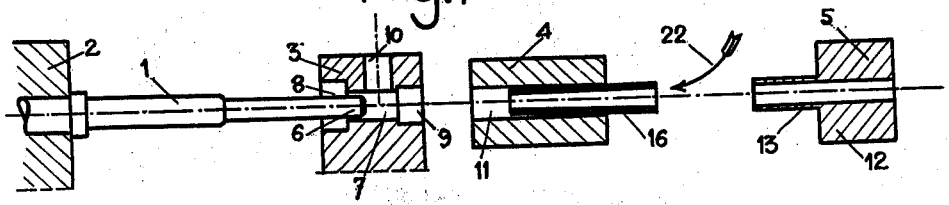
Fig. 7 is a longitudinal sectional view of a press employed during said first stage in its inoperative position.

The apparatus which is used is substantially a mechanical press. Fig. 7 and following show diagrammatically the principal elements of the apparatus mounted upon said press in their various relative positions. The apparatus comprises, mounted upon the same common shaft:

1.—A punch 1 mounted upon a carrier 2.
2.—A guiding stay 3.
3.—A die 4.
4.—An extracting stop 5.

Figure 8:
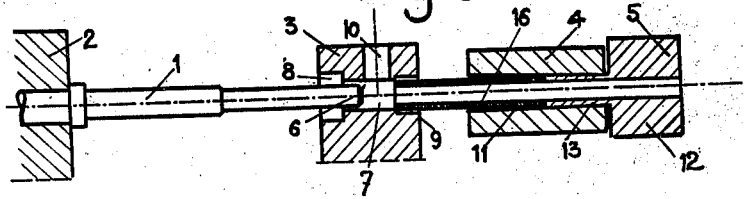
Fig. 8 is a similar view showing the extracting stop in its outer left position.
Figure 9:
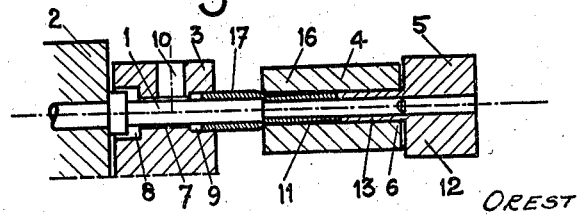
Fig. 9 shows the punch at the end of its forward stroke to the right.

The punch 1 comprises two cylindrical parts or elements: the front element of smaller diameter has the inner diameter of the original tube, while the rear element has approximately the inner diameter of the finished cartridge case. The punch is provided in front with a concave spherical surface 6; Figs. 7 and 8 show the punch in its rear position to the left; Fig. 9 showing it at the end of its forward stroke to the right.

The guiding stay 3 comprises a cylindrical passage 7 having the largest diameter of the punch. This diameter increases on the punch side at the left at 8 so as to allow the entrance of the punch neck in its forward position. Its width increases also on the opposite side at 9 so as to acquire a diameter larger by a few tenths of a millimeter than the maximum diameter of the die. The guiding stay is also provided with a cylindrical hole 10 having an axis normal to the passage 7 and of the same diameter. The guiding stay is stationary relatively to the press frame.

Figure 12:
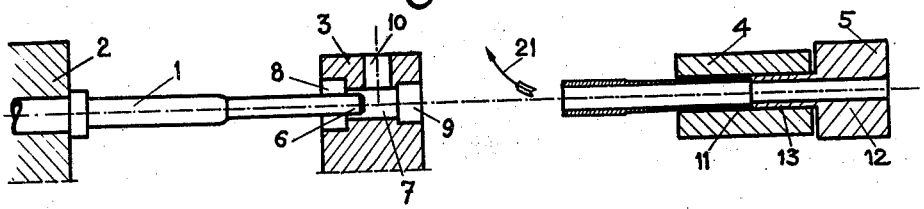
Fig. 12 shows the disengagement of the tube at the end of the drawing process.

The die 4 is provided with a conical part 11 having its largest diameter on the side of the guiding stay, on the left in the drawings. Said conical part has the external dimensions of the conical portion of the cartridge case to be produced and the same length. From that point the die is of cylindrical shape up to its other end on the right. The die is slidable so that it may move in two positions, to the left as shown in Fig. 7 in which position the die may be locked and to the right which is the position shown in Fig. 12.

The extracting stop 5, which consists of a solid part 12 extending on the side next the die in a cylindrical shank is centered upon the common sliding axis. Its outer diameter is equal to the outer diameter of the original tubular part. The whole is provided with a cylindrical hole having the same axis and the inner diameter of the original tube. The extracting stop 5 is slidable in the same manner as the die so that it may occupy two positions, the one on the left in which it may be locked and which is indicated in Fig. 8 and the disengaged position on the right which is shown in Fig. 7.

Figure 10:
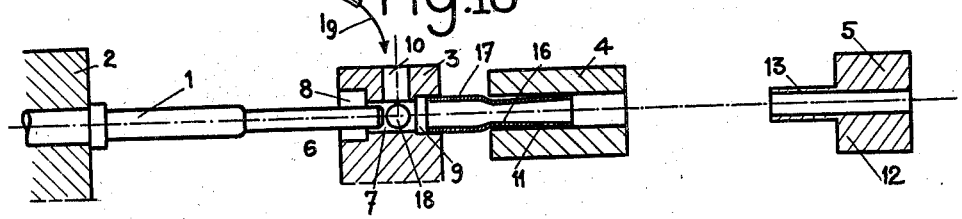
Fig. 10 is a similar longitudinal sectional view illustrating the means in position preparatory to the drawing process.
Figure 11:
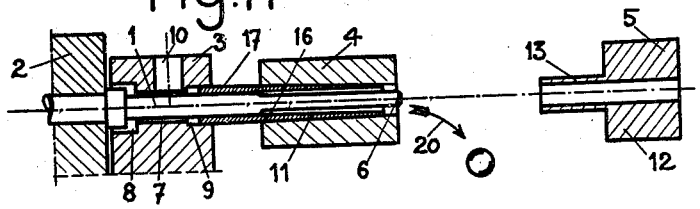
Fig. 11 is a view of the punch at the end of its forward stroke and of the drawing operation.

The mode of operation is then as follows:

The whole cycle comprises five operations each one of which is characterized by a forward and a return stroke of the punch. The tube used for making ordinary cartridge cases (7.5 to 8 m. m. bore approximately) is a cylindrical drawn weldless tube having a wall thickness of 1 mm.; its outer diameter is smaller by a few tenths of a millimeter than the smallest outer diameter of the case body to be produced (not including the worked over neck for the ball); its length is determined by the quantity of metal required plus a slight excess. In the first operation the tube acquires the shape illustrated in Fig. 2. Fig. 7 shows the charging position; the punch being in its rear position (that is, to the left in the drawings), the die is in its position on the left and the extracting stop 5 is at the right hand side. Things being thus disposed the tube 16 may be introduced into the die from right to left in the direction of the arrow 22. The extractor 5 is then returned to its position on the left as indicated in Fig. 8. During this movement the tubular part 13 enters the die and pushes back the tube 16 to the left until the latter having entered the recess 9 of the stay guide is stopped by the shoulder owing to the difference of diameter between 7 and 9. The die then comes into action and at the end of the stroke to the right occupies the position shown in Fig. 9, its front part which is of smaller diameter having thus entered inside the tube 16 without acting upon it and then in the recess of the extractor. In this manner the tube 16 is stopped towards the right by the extracting stop and is centered upon the shaft by the front of the die. The back portion of the die acting up to the die opening then forces the tube of larger diameter in the part 17, outside the die. The outer diameter of the part 17 thus forced becomes approximately equal to that of the recess 9 in the guiding stay, that is larger by a few tenths of a millimeter than the largest diameter of the die. At the end of the stroke the punch is disengaged on the left and the extracting stop is returned to its right hand position. The relative positions are then those indicated in Fig. 10. At the beginning of the next operation the parts being in the positions shown in Fig. 10, a steel ball 18 is introduced through the hole 10 in the guiding stay, in the direction indicated by the arrow 19 and falls into the recess 7. The diameter of said ball is larger by a few tenths of a millimeter than the inner diameter of the primitive tube. The die then acts to force the ball inside the tube which is retained in the die opening by its boss 17, and the portion which is in the interior of the die is enlarged, pressed against the wall and submitted to a first drawing operation owing to which it takes the shape indicated in Fig. 3. At the end of the punch stroke the ball is ejected outside the die as shown in Fig. 11, in the direction indicated by the arrow 20, and at the end of the operation the punch frees itself on the left. The third, fourth and fifth operations are identical to the second: the punch being in its rear position to the left, a new ball is introduced at 7 through the hole 10; during the forward stroke of the punch the ball is pushed inside the tube 6, and it is ejected at the end of the stroke of the punch as shown in Fig. 11. The balls employed in these successive operations are of progressively increasing diameters increasing at about 1/10 of a millimeter so that the ball in the last operation has the same inner diameter as the cartridge case to be produced. Through this successive pressing of said balls inside the tube the latter is progressively drawn so that it successively acquires the various shapes shown in Figs. 4 and 5 and lastly the shape above described and represented in Fig. 6. Fig. 11 shows the punch at the end of its stroke during the fifth operation, the drawing of the tube being then completed. Fig. 11 shows the end of the fifth operation in which the punch has been returned to its rear left position, the die is forced back in its position on the right drawing the tube along in its displacement. When the die has reached the end of its stroke the tubular portion 13 of the extracting stop operates as extractor for pushing outside of the die the tube which is then drawn out in the direction indicated by the arrow 21. The die being then returned and locked in its position to the left the operative cycle is ended and the die is ready to receive another tube.

Alternately the number of operations in the above cycle may be reduced to two. In that case the second, third, fourth and fifth operations are combined in one. The operation of a particular punch provided with a plurality of bosses of increasing diameters corresponding to those of the balls is substituted for the successive operations of the balls. The distance between said bosses upon the punch is such that each one begins to operate only when the one preceding it has completed its drawing operation. The punch thus constituted is relatively long and must be mounted upon a press having a sufficiently long run. The die is the same as the one above described and consequently the drawing operation of the punch is identical to that of the balls.

Figure 13:
Figs. 13 to 15 illustrate the changes undergone by the tube during the second operative stage.
Figure 15:
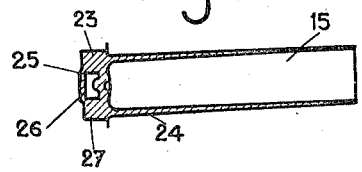

In the second manufacturing stage, the blank produced at the end of the first stage, and which is shown in Fig. 13 is closed on the side of the bulged cylindrical portion 14 which has not been drawn and affects the shape of the case illustrated in Fig. 15. Said case comprises a body 15 proceeding from the primitive shape in Fig. 13 without any modification and corresponding therefore as above mentioned, to the body of the case to be produced. On the other hand, the closing which has been effected constitutes a bottom 23 similar to that of the case with inner and outer surfaces 24, 25 completely finished, including the priming recess 26. Said cartridge case bottom is provided with a slight excess of metal upon its circumference at 27.

I will now describe the apparatus employed for closing the tube and its mode of operation.

Figs. 16, 17, 18, 19, 20 and 21 show the apparatus in various positions. It is mounted as a whole upon the heads 28, 29 of a very strong machine frame 30. The principal elements of said apparatus are the following:

1.—A revolving die 31.
2.—A punch 32 and its guide 33.
3.—An outer mandrel 34.
4.—A counter-punch 35.

The revolving die consists in a high speed steel disk having a thickness of from about 6 to 8 millimeters, provided in the middle with a cylindrical hole 36 whose diameter is equal to the outer diameter of the portion 14 of the flank produced in the first stage of operation. Said die rotates at a speed of approximately 1500 turns per minute around the common center 37. Said rotary motion is transmitted to the die by a feed system integral with it and consisting in the present case of a toothed pinion 38 actuated by means of a gear not shown. The die with its driving pinion is mounted upon the head 28 by the intermediary of two ball bearings one of which, namely, the bearing 39, comprises a rolling abutment for the strains which tend to press the die against the head 28 of the frame, that is to the right in the drawings.

The punch 32 also of high speed tool steel is of cylindrical shape. It passes through a guide 33 secured upon the head 28, the diameter of the punch and the inner diameter of the guide being equal to that of the die hole 36. The shape of the front surface 40 of the punch is the reverse of that of the back surface of the bottom of the cartridge case in order to stamp said shape upon the metal. Fig. 16 shows the punch in its rear position to the right, it may effect a forward displacement to the left in order to come in the position indicated in Fig. 19, and a return movement to its first position. The forward stroke produced either by a screw press, a hydraulic or any other kind of press must be powerful enough to crush the metal section presented by the portion 14 of the tube to be closed. Lastly, the punch must be keyed in position so as to prevent it from turning upon its shaft. The front surface 41 of the guide is adjusted so as to be in slightly frictional engagement with the die.

The outer mandrel 34 is provided with a recess 42 which is identical to that of the die 4 of the apparatus described for the first stage; this arrangement permits an exact fitting in the conical part 15 of the tube. The mandrel is secured at the end of a slide 43 which allows it to take two positions: a rear position indicated in Fig. 16 and a front position indicated in Fig. 17. The slide carries upon its front surface an abutment bearing 44. The whole is adjusted in such a manner that the front position of the slide 43 causes the rotary die 31 to be clutched between both abutment bearings 39 and 44 and that on the other hand the front surface 45 of the mandrel 34 engages with slight friction the outer surface of the rotary die.

The counter punch 35 is a high-speed steel cylindrical part whose diameter is equal to the inner dimension of the cartridge case bottom plus a slight play. Its front surface 46 has a shape which is the reverse of that of the inner surface of the bottom of the cartridge case. Said counter punch may take several positions; 1st, the rear position shown in Fig. 16; 2nd, a front position shown in Figs. 18 and 19 in which the end of the counter punch engages the plane of the outer surface of the mandrel 34, the slide being at that moment in its front position. 3rd, an intermediary position indicated in Figs. 20 and 21, which is taken during the return stroke from the front of the rear position.

Lastly, the space between the frame heads 28, 29 is arranged so as to form a cup in which oil is maintained at a level slightly lower than that of the shaft of the mechanisms. This allows the lubricating and the cooling of said mechanisms and more especially of the rotary die. The heating of the oil is prevented by causing it to circulate in a refrigerating circuit. A protecting casing not shown in the drawings surrounds the rotating parts in order to prevent splashing of the oil.

In that case the mode of operation is the following:

Fig. 16 shows the feeding position; the slide 43 has been returned to its rear position that is on the left as well as the counter punch 35, the punch 32 occupies also its rear position on the right. The tube produced in the first operative stage is then placed so that its axis coincides with the common axis of the apparatus between the heads 28 and 29, the bulged portion 14 being towards the rotary die and the drawn portion 15 towards the outer mandrel 34. The slide then moves to its front position on the right as shown in Fig. 17, the counter punch 35 following exactly said movement. Consequently, the bulged portion 14 of the tube fits into the recess produced by the boring of the rotary die 31 and of the guide 33 of the punch 32, the drawn portion 15 fitting exactly in the recess of the outer mandrel 34.

Figure 14:

The slide having stopped in its forward position, the counter punch 35 continues to move forward passing through the tube to come also in its front position as shown in Fig. 18. The working stage then begins; the punch 32 advances to the left so as to come at the end of its stroke in the position shown in Fig. 19, so that the space between it and the counter punch is precisely that of the bottom of the cartridge case. The movement of the punch is relatively slow, of the order of one to two seconds for example. It causes the upsetting and the crushing of the metal but under the action of the rotary die and of the considerable heating caused by friction upon the wall of the tube, the metal of the latter acts in the region of the die in the same manner as a plastic material, that is a flange is formed in said region and thickens as it nears the center as the die moves forward. The inner edge of said flange lastly closes upon the shaft, the metal welding upon itself as it regains along this closing line all its molecular cohesion. Simultaneously with said closing the metal is modelled between the punch and the counter punch so as to take the shape of the cartridge case bottom 47. Fig. 14 indicates the metal flange before the closure during the process. Fig. 15 shows the case as it is produced at the end of the punch stroke the latter being then returned. The unity consisting of the slide and the counter punch is also moved back and when it has reached the position indicated in Fig. 20 the counter punch remains stationary in said intermediary position while the slide pursues its return stroke to its rear position as shown in Fig. 21. During this part of the slide stroke the counter punch draws the case out of the mandrel, the counter punch taking up again its return stroke to reach its rear position. The case will be extracted without difficulty during said movement. The complete operative cycle being then ended the apparatus is in its primitive position.

In a modified form of execution the die 31 is stationary and the counter punch 35 with the body of the case will be rotated by any appropriate means.

Figure 22:
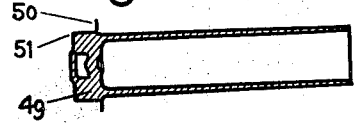
Figs. 22 to 24 illustrate in longitudinal sectional views the changes undergone by the case during the finishing stage.
Figure 23:
Figure 24:
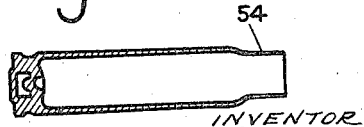

The third operative stage consists in the finishing of the case. Fig. 22 shows said case after the second stage before it is turned for finishing the bottom. Said turning eliminates the excess of metal which exists normally at 49, as well as the metal which may have spurted out at 50 and 51; it also forms the clip groove 52 and the chamfer 53. At the end of this operation the case presents the shape shown in Fig. 23. It is then finished off by hammering out the neck 54 for the ball in the ordinary manner. Fig. 24 shows the cartridge case completely finished.

It will be evident that in the case of manufacturing any type of case the first stage not being necessary the operation will be limited to the second or closing stage.

What I claim and desire to secure by Letters Patent of the United States is:

1. A method for manufacturing a cartridge case blank which consists in partly introducing a drawn tube having a diameter which is inferior to the smallest diameter of the case in a die whose inner shape is identical to the outer shape of the corresponding portion of the case, in flanging by means of an expanding punch the portion of said tube which is not engaged in said die, in then drawing the portion of the tube engaged in said die until it fits exactly the inner shape of same and in closing the back opening of the tube portion which has been expanded by the punch.

2. A method for manufacturing a cartridge case blank which consists in partly introducing a drawn tube having a diameter which is inferior to the smallest diameter of the case in a die whose inner shape is identical to the outer shape of the corresponding portion of the case, in flanging by means of an expanding punch the portion of said tube which is not engaged in said die, in then drawing the portion of the tube engaged in said die until it fits exactly the inner shape of same in forcing balls of increasing diameter inside said tube portion, and in closing the back opening of the tube portion which has been expanded by the punch.

3. A method for manufacturing a cartridge case blank which consists in partly introducing a drawn tube having a diameter which is inferior to the smallest diameter of the case in a die whose inner shape is identical to the outer shape of the corresponding portion of the case, in flanging by means of an expanding punch the portion of said tube which is not engaged in said die, in then drawing the portion of the tube engaged in said die until it fits exactly the inner shape of same in forcing in said portion a punch provided with a series of bosses of increasing diameters, said bosses being divided from one another by intervals such that each one of them comes into operation only when the preceding one has come out of the tube, and in closing the back opening of the portion of the tube which has been expanded by the first named punch.

4. A method for manufacturing a cartridge case blank which consists in partly introducing a drawn tube having a diameter which is inferior to the smallest diameter of the case in a die whose inner shape is identical to the outer shape of the corresponding portion of the case, in flanging by means of an expanding punch the portion of said tube which is not engaged in said die, in then drawing the portion of the tube engaged in said die until it fits exactly the inner shape of same and in forcing balls of increasing diameter in said portion in hammering the metal of the tube beginning from the back opening between a counter punch fixed in position and a movable punch, said tube being surrounded at that point by a die having a high speed rotary motion relatively to the punch and to the tube, so that owing to the heat produced by friction the upset metal acting in the same manner as a plastic material closes the tube as it fills the free space designed to receive it when the punch is at the end of its stroke.

ORESTE BIGINELLI.